(12) United States Patent
Smith et al.

(10) Patent No.: US 7,048,081 B2
(45) Date of Patent: May 23, 2006

(54) SUPERABRASIVE CUTTING ELEMENT HAVING AN ASPERITAL CUTTING FACE AND DRILL BIT SO EQUIPPED

(75) Inventors: Redd H. Smith, The Woodlands, TX (US); Marcus R. Skeem, Sandy, UT (US); Craig H. Cooley, Saratoga Springs, UT (US)

(73) Assignee: Baker Hughes Incorporated, Houston, TX (US)

( * ) Notice: Subject to any disclaimer, the term of this patent is extended or adjusted under 35 U.S.C. 154(b) by 30 days.

(21) Appl. No.: 10/447,884

(22) Filed: May 28, 2003

(65) Prior Publication Data

US 2004/0238227 A1    Dec. 2, 2004

(51) Int. Cl.
*E21B 10/46* (2006.01)
(52) U.S. Cl. .................. 175/434; 175/426; 51/295
(58) Field of Classification Search ................ 175/426, 175/428, 434; 51/295
See application file for complete search history.

(56) References Cited

U.S. PATENT DOCUMENTS

| | | | |
|---|---|---|---|
| 3,745,623 A | 7/1973 | Wentorf, Jr. et al. | |
| 3,885,637 A | 5/1975 | Veprintsev et al. | |
| 4,311,490 A | 1/1982 | Bovenkerk et al. | |
| 4,525,178 A | 6/1985 | Hall | |
| 4,547,407 A * | 10/1985 | Spencer, Jr. | 427/367 |
| 4,604,106 A | 8/1986 | Hall et al. | |
| RE32,380 E | 3/1987 | Wentorf, Jr. et al. | |
| 4,726,718 A | 2/1988 | Meskin et al. | |
| 4,943,488 A | 7/1990 | Sung et al. | |
| 4,988,421 A | 1/1991 | Drawl et al. | |
| 4,992,082 A | 2/1991 | Drawl et al. | |
| 5,011,514 A | 4/1991 | Cho et al. | |
| 5,011,515 A | 4/1991 | Frushour | |
| 5,028,177 A | 7/1991 | Meskin et al. | |
| 5,049,164 A | 9/1991 | Horton et al. | |
| 5,096,465 A | 3/1992 | Chen et al. | |
| 5,127,923 A | 7/1992 | Bunting et al. | |
| 5,151,107 A | 9/1992 | Cho et al. | |
| 5,161,627 A | 11/1992 | Burkett | |
| 5,238,074 A | 8/1993 | Tibbitts et al. | |
| 5,348,109 A | 9/1994 | Griffin | |
| 5,607,024 A * | 3/1997 | Keith et al. | 175/431 |
| 5,639,285 A | 6/1997 | Yao et al. | |
| 5,653,300 A | 8/1997 | Lund et al. | |
| 5,667,903 A | 9/1997 | Boyce | |
| 5,755,299 A | 5/1998 | Langford, Jr. et al. | |
| 5,967,250 A | 10/1999 | Lund et al. | |
| 5,979,578 A * | 11/1999 | Packer | 175/432 |

(Continued)

OTHER PUBLICATIONS

Superior Cutter Technology, The Hycalog Philosophy, Sep. 1997.

(Continued)

*Primary Examiner*—David Bagnell
*Assistant Examiner*—Daniel P Stephenson
(74) *Attorney, Agent, or Firm*—TraskBritt

(57) ABSTRACT

A superabrasive cutting element for use with a drill bit for drilling subterranean formations and having a superabrasive table, or cutting face, in which a conglomerate of superabrasive particles is dispersed and bonded, or sintered, and in which at least one exposed cutting region of the superabrasive table develops a rough, asperital surface for improving the cutting efficiency of the drill bit, particularly in but not limited to relatively hard, relatively nonabrasive formations. The superabrasive table may include superabrasive particles of substantially differing size, or quality or a combination of differing size and quality. A rotary drill bit including cutting elements embodying the present invention is also disclosed.

49 Claims, 5 Drawing Sheets

U.S. PATENT DOCUMENTS

| | | |
|---|---|---|
| 6,102,140 A | 8/2000 | Boyce et al. |
| 6,187,068 B1 * | 2/2001 | Frushour et al. ............. 51/295 |
| 6,371,226 B1 * | 4/2002 | Caraway ................. 175/420.2 |
| 6,852,414 B1 | 2/2005 | Frushour |

OTHER PUBLICATIONS

Photos of Phoenix Crystal PDC Cutter, received Aug. 22, 2002.

* cited by examiner

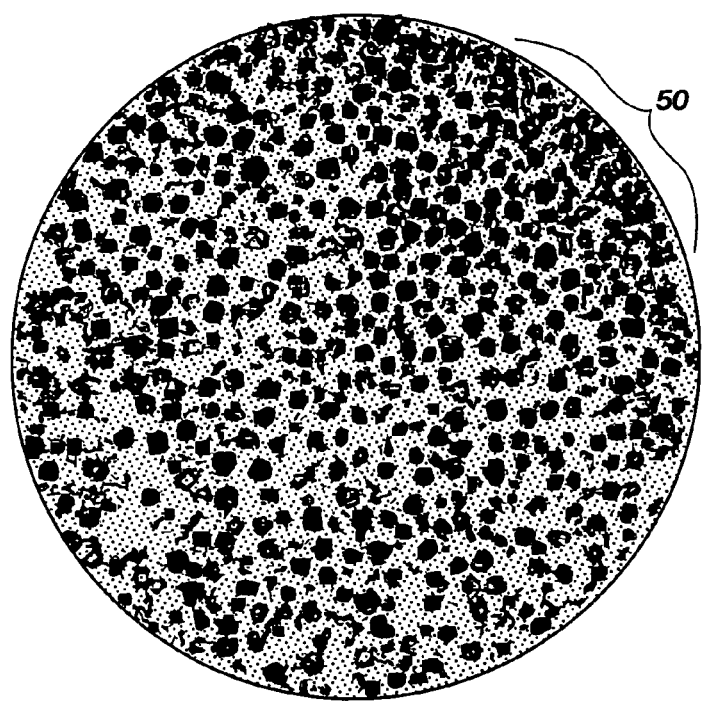
FIG. 5 (8X)
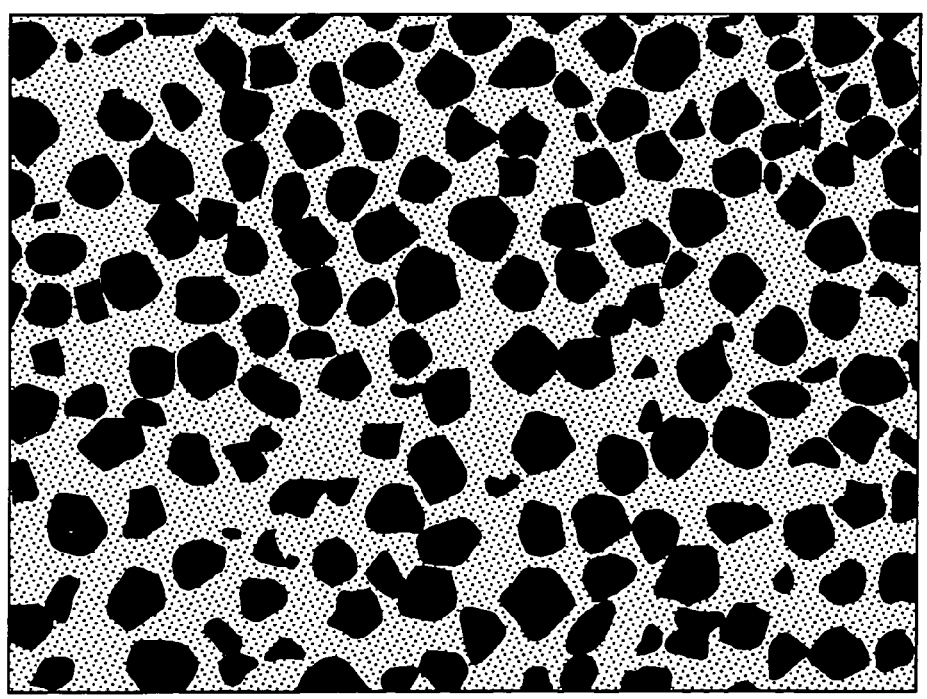
FIG. 6 (20X)

SUPERABRASIVE CUTTING ELEMENT HAVING AN ASPERITAL CUTTING FACE AND DRILL BIT SO EQUIPPED

BACKGROUND OF THE INVENTION

1. Field of the Invention

This invention relates generally to superabrasive cutting elements and, more specifically, to polycrystalline diamond compact cutting elements and drill bits for subterranean drilling equipped with such cutting elements.

2. State of the Art

Superabrasive elements are used extensively in drilling, cutting, milling, and other operations relating to the removal of portions of hard materials. A superabrasive element useful in subterranean drilling conventionally includes a polycrystalline diamond (PCD) table, having a cutting surface, or face, of natural or synthetic diamond particles or, less typically, cubic boron nitride (CBN) particles sintered under high-pressure, high-temperature conditions into a coherent conglomerate mass. Such tables are referred to herein generally as superabrasive tables. In order to support the very hard but relatively brittle PCD table, the PCD table is typically bonded to a substrate of tungsten carbide or other similarly tough cemented carbide substrate by way of high-pressure, high-temperature (HPHT) sintering techniques known within the art to form a unified structure which is typically cylindrically shaped and referred to within the art as a polycrystalline diamond compact cutting element, "PDC cutting element" or "PDC cutter." A plurality of such PDC cutting elements, or cutters, may be mounted in a wide variety of patterns on at least the face portion of a rotary drill bit to provide a bit that is particularly useful for drilling subterranean formations. Typically, such PDC cutting elements are formed by placing a cemented tungsten carbide substrate preform into a specially designed press and placing a superabrasive material such as diamond particles, or grains, of a preselected size as well as a sintering agent, or catalyst, such as cobalt, atop the substrate preform and enclosing them in a protective metal enclosure. Under the previously mentioned high-pressure and high-temperature conditions, which may respectively exceed approximately 50 kbars (approximately 5000 Mpa) and approximately 1200° C., the diamond grains are sintered or bonded together to form the previously described PCD table while simultaneously sintering, or bonding, the superabrasive table and the tungsten substrate together to form a unified PDC cutting element that may then be securely installed in a drill bit by way of brazing or other bonding techniques known within the art.

In the past, the diamond grains, or particles, generally used as feed stock in forming a superabrasive table, whether natural or synthetically derived, had nominal diameters, or sizes, which fell within a preselected relatively narrow range, or size distribution. Such a narrow size distribution resulted in superabrasive tables being formed of a diamond feed stock which would have a homogenous structure of essentially uniform, like-sized, like-quality diamond particles, or grains. That is, the feed stock of diamond grains, or particles, used to form a superabrasive table would generally be of a similar quality and a quite similar small, or fine, size. The grain size of such conventional diamond feedstocks typically ranges from 1 micron (1 μm) to 100 microns (100 μm), with a nominal size of 30 μm to 60 μm being common.

Currently, manufacturers and vendors of cutting elements used for industrial purposes such as in the drilling of subterranean formations are using "multimodal" feedstocks in making superabrasive tables for cutting elements such as PDC cutting elements. Such "multimodal" feedstocks typically consist of a mixture of superabrasive particle sizes that tend to vary over a wider range than the feedstocks used to make superabrasive tables in the past. However, these "multimodal" feedstocks tend to comprise superabrasive particle sizes in the range of zero to thirty microns (0–30 μm). The lower end of the range, being designated as zero, indicates the presence of submicron-sized particles. However, it is important to note that even the modem "multimodal" feedstocks typically used in forrming superabrasive tables of cutting elements such as PDC cutting elements installed on subterranean drill bits, will typically have an average particle size ranging from 15 to 25 μm, although multimodal superabrasive tables having an average particle size of 30 to 60 μm are known.

PDC cutting elements have been commercially available for more than 25 years and have become widely accepted and heavily relied upon by the oil and gas industry. For example, PDC cutting elements are installed in rotary drill bits, such as "drag bits" used extensively in the drilling, or boring, of wells in subterranean formations in the exploration and production of hydrocarbons in the form of crude oil and natural gas, as well as for the drilling of geothermal wells and special purpose wells, such as steam injection wells and monitoring wells. The use of PDC cutting elements in rotary drag bits for earth boring has resulted in major increases in penetration rates and overall reductions in drilling costs for a broadened range of subterranean formation types.

Notwithstanding the many benefits offered by PDC cutting elements when drilling certain hard but not necessarily highly abrasive rock formations such as, but not limited to, the drilling of formations of limestones, marble, dolomite, and some evaporites, PDC cutting element-equipped drill bits may have a tendency to produce a relatively smooth, flat surface, or wear scar, on the cutting edges and related surfaces of each of the PDC cutting elements, reducing the ability of the drill bit to cut the formation. That is, it is not uncommon when drilling in hard but not necessarily abrasive formations over an extended period of time with drill bits provided with currently available PDC cutting elements for the wear scars of the individual PDC cutting elements to, in effect, form a bearing surface, or contact area, between each of the PDC cutting elements secured to the drill bit and the formation being drilled. Such bearing surfaces in effect stop or severely reduce the rate of formation cutting as the conventional PDC cutting elements are not able to adequately engage and efficiently remove the formation material from the area of contact. This type of unwanted bearing surface, or contact area, is also referred to within the art as a "wear flat" in addition to being referred to as a "wear scar."

Therefore, the rate of penetration (ROP) or speed in which the drill bit progresses through such hard, nonabrasive formations may often be reduced, or slowed, because the superabrasive table of the cutting elements, being composed of a homogeneous structure of substantially fine, like-sized, like-quality diamond particles, or grains, as previously described, is unable to provide cutting surfaces or edges which will optimally engage and remove formation material as efficiently as would be desired to maintain a given ROP as compared to the ROP of the same drill bit in other formations, including, but not limited to, formations that are relatively less or more hard, but which are relatively more abrasive. Additionally, relatively fine, homogeneous diamond particle sizes with homogeneous wear characteristics used to manufacture a superabrasive table may allow an initially sharp cutting edge to become rounded with use. Such rounding or dulling of the cutting edge also reduces the ability and effectiveness of the cutting elements to remove the formation material.

U.S. Pat. Nos. 5,011,514 and 5,151,107 to Cho et al. disclose superabrasive cutting elements, backed compacts, and methods for their manufacture wherein superabrasive particles such as diamonds are provided with a metal coating prior to being sintered to form a polycrystalline compact. In one embodiment, metal-coated superabrasive particles of a preferably uniform size are combined with uncoated superabrasive particles of a smaller size within a preselected binder to form a "bimodal" cutting element. Cho et al. further discloses that an additional, yet smaller, superabrasive powder may be added to form a "trimodal" cutting element.

U.S. Pat. No. 5,096,465 to Chen et al. discloses a superhard cutting element manufactured by a low-temperature, low-pressure infiltration process suitable for use within an earth-boring bit being formed by metallic-coated abrasive particles of a single large size within a range of 50–2000 μm, with about 400–600 μm being preferred, and being combined with a binder alloy so that the diamond particle component ranges from approximately 40–75% by volume of the superabrasive table with the remainder of the volume being a suitable infiltrating alloy such as nickel, cobalt, iron, aluminum, and copper-based alloys. Alternatively, a bimodal distribution of larger-sized coated superhard particles within a range of 400–600 μm combined with smaller-sized superhard particles selected from a size range of about 50–65 μm may be used with an alloy binder to form a superhard cutting element in accordance with Chen et al. In the bimodal alternative, the larger-sized coated superhard particle concentration is taught as being approximately 90% by volume of the total diamond component and the smaller-sized coated superhard particle concentration is taught as being approximately 10% by volume of the total diamond component wherein the total diamond component may reach as high as 75% by volume. A further embodiment is disclosed in Chen et al., featuring a superhard product having a trimodal distribution of particles wherein the third charge of yet smaller superhard or abrasive particles is sized to be about ⅙ to ⅑ the size of the secondary charge of particles.

A diamond cutter for use in a drill bit fabricated by assembling a plurality of prefabricated thermally stable PCD elements of preselected geometric shapes and sizes placed and bonded together in a preselected array within a cutting slug is disclosed in U.S. Pat. No. 5,028,177 to Meskin et al. Embodiments having the thermally stable PCD elements sintered within a metallic matrix material having diamond grit therein are set forth in Meskin et al.

In U.S. Pat. Nos. 4,988,421 and 4,992,082 to Drawl et al., a tool is formed by coating a plurality of layers of separated diamonds or diamond-like particles onto a nondiamond, or nondiamond-like tool substrate wherein a planarized binding material extends between and on each of the separated diamond particles to secure the diamond particles.

U.S. Pat. No. 4,604,106 to Hall et al. discloses a PCD compact having precemented carbide pieces interspersed in polycrystalline diamond and a binder to provide a composite abrasive compact. One embodiment comprises a compact formed of a composite material wherein the concentration of the diamond particles is at its highest near the working surface and the concentration of the carbide pieces is at its highest away from the working surface. Another embodiment is disclosed having a plurality of layers wherein a transition layer having a mixture of diamond crystals and pieces of precemented carbide together with a catalyst/binder material is provided.

U.S. Pat. No. 4,525,178 to Hall (Reexamination Certificate issued Mar. 27, 1990) is directed toward a material comprised of a polycrystalline material and preferably larger precemented carbide masses dispersed and sintered in the presence of a binder. The placement, shape, and size of the carbide masses may be varied to optimize performance of the subject material.

A process for forming a composite compact is disclosed in U.S. Pat. No. 4,311,490 to Bovenkerk et al., wherein a mass of abrasive crystals, a mass of metal carbide, and a bonding medium are sintered together. Bovenkerk et al. sets forth a process of placing a mass of abrasive crystals, and quantity of metal carbide, and bonding material or a catalyst within a protective shield metal enclosure and subjecting the contents of the enclosure to high-pressure and high-temperature. The process further includes disposing the abrasive crystals in two separate layers comprised of coarser abrasive crystals having a largest dimension of between about 75 to 500 μm disposed in one layer and the finer abrasive crystals having a largest diameter of less than 10 μm disposed in a second layer.

A cutting element formed from a plurality of polycrystalline diamond compact elements of a varying thickness and/or varying hardness to provide a cutting edge having a nonuniform wear pattern is disclosed by the assignee of the present invention in U.S. Pat. No. 5,238,074 to Tibbitts et al. The PCD elements may be of varying thickness and/or hardness to provide a cutting edge having a wear ratio which varies with cutter wear.

U.S. Pat. No. 3,885,637 to Veprintsev et al. sets forth a boring tool in which cutting elements having coarse abrasive grains embedded in a matrix layer ranging in thickness of about one-half to about two-thirds of the height of the coarse abrasive grains and in which the matrix layer contains fine abrasive grains embedded therein. The remaining portion of the large grains is covered with a second metallic layer. The coarse abrasive grains range in size from 1 to 2.5 mm and the fine abrasive grains range in size from 50 to 800 μm with layer 5 ranging from 0.3 to 0.6 mm.

U.S. Pat. No. 6,102,140 to Boyce et al. sets forth rotary cone cutter inserts having coated or encrusted diamond particles dispersed within a matrix body in a zone of the insert intended to engage earthen formations. The zone of the insert includes encrusted diamond pellets, tungsten carbide, and metallic cobalt which are fused together. The coating, or encrustation, is taught to be of a thickness equal to approximately one half the nominal diameter of the associated diamond particles. The encrusted diamond particles are taught as being distributed in the earthen formation-engaging zone of the insert in an amount of approximately 25% to approximately 75% by volume with up to 100% by volume being mentioned. Discrete sintered tungsten carbide particles are taught as forming a portion of the earthen formation-engaging zone of the insert.

Notwithstanding the preceding patents regarding the forming of cutting surfaces and/or cutting elements having superabrasive tables, there remains a need for cutting elements and/or superabrasive tables that offer improved cutting efficiencies over cutting elements known within the art when drilling in certain hard rock formations.

Thus, further advancements in the art are needed to increase the rate of penetration (ROP), or speed, in which a drill bit provided with PDC cutting elements is able to drill through not only certain hard, nonabrasive formations but any formation. Furthermore, the art seeks drill bits having increased ROP while retaining, if not improving, the desired attributes that drill bits provided with PDC cutting elements are known to have such as formation versatility, high impact toughness, high abrasion resistance, and generally high longevity in the very harsh conditions that are typically encountered in a downhole environment.

The cutting element of the present invention is particularly suited for being installed on a rotary drill bit and preferably comprises a superabrasive table of a nominal thickness and shape and which has at least one exposed cutting surface for engaging and cutting a subterranean formation. At least a portion of the superabrasive table may be formed by mixing a plurality of superabrasive particles exhibiting certain wear characteristics, such as synthetic or natural diamonds, with another plurality of superabrasive particles exhibiting different wear characteristics, such as synthetic or natural diamonds and, optionally, a binding catalyst such as cobalt powder. Upon the superabrasive particles being bound, or sintered, together by known high-pressure, high-temperature sintering processes, the surface or cutting face of the table of the cutting element is ground, lapped or even polished to exhibit a smooth, uniform exterior.

As the cutting element or, more precisely, the cutting edge of the superabrasive table at a periphery of the cutting face wears, the differences in relative wear characteristics of the different pluralities of superabrasive particles in that region of the cutting face cause the cutting edge to wear unevenly. Upon wearing, numerous vugs or asperities are formed in the cutting edge of the superabrasive table, which accentuate the roughness, or asperitness, of the diamond material contacting the formation. Thus, the cutting edge of the superabrasive table of the cutting element is constantly provided with a "rough cut" surface throughout the life of the cutting element as the diamond particles wear differently. This uneven, disparate wear process is continuously repeated until the entire useful portion of the superabrasive table has been worn away or the cutting element is retired from service. Thus, the preferably more predominant, jagged surfaces of the more wear-resistant diamonds that remain after the less wear-resistant diamonds have more quickly worn away or released from the superabrasive table concentrate the cutting forces in localized regions to better engage, fracture, and more aggressively remove the formation material into which the drill bit incorporating the cutting elements is drilling. Additionally, the conglomeratic nature of the superabrasive table being comprised of different particle size crystals prevents the formation of a uniform rounding or dulling of the cutting edge engaging the formation, thereby maintaining a more efficient cutting structure.

A drill bit equipped with cutting elements embodying the present invention is particularly well suited for drilling in hard, nonabrasive formations such as limestones, dolomites, marbles, and other sedimentary or evaporite formations without sacrificing the performance of such an equipped drill bit when drilling in more abrasive formations. Therefore, a drill bit provided with cutting elements embodying the present invention will have an overall increased level of formation versatility and an overall increased level of cutting efficiency and ROP as compared to prior art PDC cutting elements. Although cutting elements and drill bits embodying the present invention are particularly well suited for use in drilling in sedimentary, or evaporite formations, cutting elements embodying the present invention are not limited to such, as the same benefits and improved performance of cutting elements and drill bits embodying the present invention will also be applicable when drilling in other formations including, for example, hard, abrasive formations.

Differently sized superabrasive particles may be used to fabricate PDC cutting elements, in order to more closely pack the diamond particles. Accordingly, the present invention in one embodiment may incorporate the use of, for example, at least two different size ranges of diamond particles, wherein the relatively larger-sized superabrasive particles of a first size range may have nominal diameters which may range upwards of approximately 600 µm, with an exemplary range of between approximately 100 µm and approximately 600 µm, and the relatively smaller-sized superabrasive particles of a second size range may have nominal diameters in an exemplary range of between approximately 15 µm and 100 µm.

In another embodiment, relatively larger-sized superabrasive particles of a first size range may have nominal diameters which may range upwards of approximately 500 µm, with an exemplary range of between approximately 100 µm and approximately 250 µm. and the relatively smaller-sized superabrasive particles of a second size range may have nominal diameters in an exemplary range of between approximately 15 µm and 40 µm.

Thus, a first volume of relatively larger-sized superabrasive particles will exhibit a wear rate that generally falls within a first distribution range due to materials and processes used in fabrication thereof, and a second volume of relatively smaller-sized superabrasive particles will exhibit another wear rate that generally falls within a second, different distribution range due to the materials and processes used in fabrication thereof. It is contemplated that superabrasive particles in three or more size ranges may also be employed in fabricating cutting elements according to the present invention. Significantly, notwithstanding size differences, the wear characteristics of one volume of superabrasive particles are different than a second or succeeding volumes of superabrasive particles.

For example, a superabrasive table may be manufactured from approximately 85% by weight of 100 µm diameter superabrasive particles and from 15% by weight of 40 µm superabrasive particles exhibiting different wearing characteristics. Cobalt may be used as known in the art as a catalyst in a high-pressure, high-temperature (HPHT) sintering process with the diamond particles to stimulate diamond-to-diamond bonding. Alternatively, particle sizes and percentages may comprise 20% by weight of 40 µm particles, 20% by weight of 100 µm particles, and 60% by weight of 400 µm particles, with at least some of the particles exhibiting substantially different wear characteristics. Other relative proportions by weight of superabrasive, such as diamond, particles of different sizes suitable for use in the present invention include, by way of example only: 60% of 400 µm particles and 40% of 100 µm particles; 70% of 400 µm particles and 30% of 100 µm particles; 85% of 100 µm particles, 10% of 40 µm particles and 5% of 20 µm particles.

Further, the present invention contemplates use of substantially uniformly-sized particles which exhibit substantially different wear characteristics. A superabrasive table may be manufactured, for example, by mixing 50% by weight of 100 µm diamond particles with certain wear characteristics and 50% by weight of 100 µm diamond particles with substantially different wear characteristics. Of course, volumes of diamond particles exhibiting more than two different wear characteristics may also be employed. One exemplary embodiment for creating particles with different wear characteristics may comprise exposure of diamond particles to multiple HPHT sintering processes. Thus, sintered particulate diamond material may be manufactured by an HPHT process as known in the art and then sized to be used in subsequent HPHT processes for making superabrasive tables. Multiple sintering processes for the diamond particles may be employed. Enhanced diamond-to-diamond bonding or improved distribution of catalyst material may also be used to affect wear characteristics. Also, different superabrasive materials and/or processing techniques may be used in production of a superabrasive table comprised of materials with substantially different wear characteristics.

Exemplary superabrasive tables may have an exemplary thickness ranging between approximately 1 mm to approximately 5 mm; however, the present invention is readily suitable for use with a superabrasive table thickness outside this range. Because newly manufactured cutting elements, or cutters, embodying the present invention will generally have cutting surfaces that are relatively smooth as a result of being ground, lapped or polished, the cutting elements may need to be "broken-in." That is, after the drill bit in which the cutting elements are installed has been placed into service and has actively engaged and removed formation material within a wellbore, the bit will become broken-in after a period of time. Thus, after the drill bit has initially been placed into service, the cutting elements will wear slightly as is expected and desired, which wear will cause the cutting elements to exhibit the roughcut, or asperital, cutting surfaces in accordance with the present invention.

Another embodiment of the present invention, which may be used in lieu of or in conjunction with other embodiments hereof, not only includes using differently sized superabrasive particles, or diamonds, to make superabrasive tables, but also includes the use of substantially different grades. Thus, for example, a mixture of at least two different feed stocks of superabrasive particles, such as diamonds, which have different inherent qualities and strengths may be used to provide a superabrasive table in accordance with the present invention. As such a superabrasive table wears, the superabrasive particles of higher quality and strength will remain bound within the table structure longer than the superabrasive particles of lower quality and strength, which will be more readily fractured or damaged and, as a result, be dislodged from the table or face as the cutting element wears. Thus, the higher-quality particles provide the more pronounced, jagged exposed cutting surfaces, or cutting edges, and the vugs, or asperities resulting from the more readily worn, destroyed, and/or displaced lesser quality particles accentuate the exposed rough, jagged cutting region of the cutter and especially the cutting edge of the superabrasive table of the cutter.

BRIEF DESCRIPTION OF THE SEVERAL VIEWS OF THE DRAWINGS

The following drawings illustrate various exemplary embodiments of the invention, not necessarily drawn to scale, wherein:

FIG. 4B' is an enlarged cross-sectional view of an isolated edge portion of a superabrasive table incorporating another alternative embodiment of the present invention and after being placed into service as taken in the same direction and depicted in the same manner as the enlarged, isolated cross-sectional view of the cutting element of FIG. 4B; as with FIG. 4A, the differently sized superabrasive particles (not to scale) are shown;

FIG. 5 is a photomicrograph of a top view of the cutting face of an exemplary cutting element embodying the present invention, wherein the image of FIG. 5 has been magnified eight times the actual size; and FIG. 6 is a photomicrograph of a representative portion of the cutting face depicted in FIG. 5, wherein the image of FIG. 6 has been magnified twenty times the actual size.

In accordance with this invention, cutting elements particularly suitable for earth-boring drill bits are formed in a manner resulting in and maintaining an asperital, or rough, exposed surface on at least a portion of the cutting edge or other surfaces of the superabrasive table which are located and oriented to engage the formation after a cutting element has experienced some wear. The superabrasive table may include randomly distributed superabrasive particles of at least two substantially different nominal or average sizes resulting in at least one cutting edge or at least one exposed surface of the superabrasive table of the cutting element to generate concentrated cutting forces in localized regions.

Figure 1:
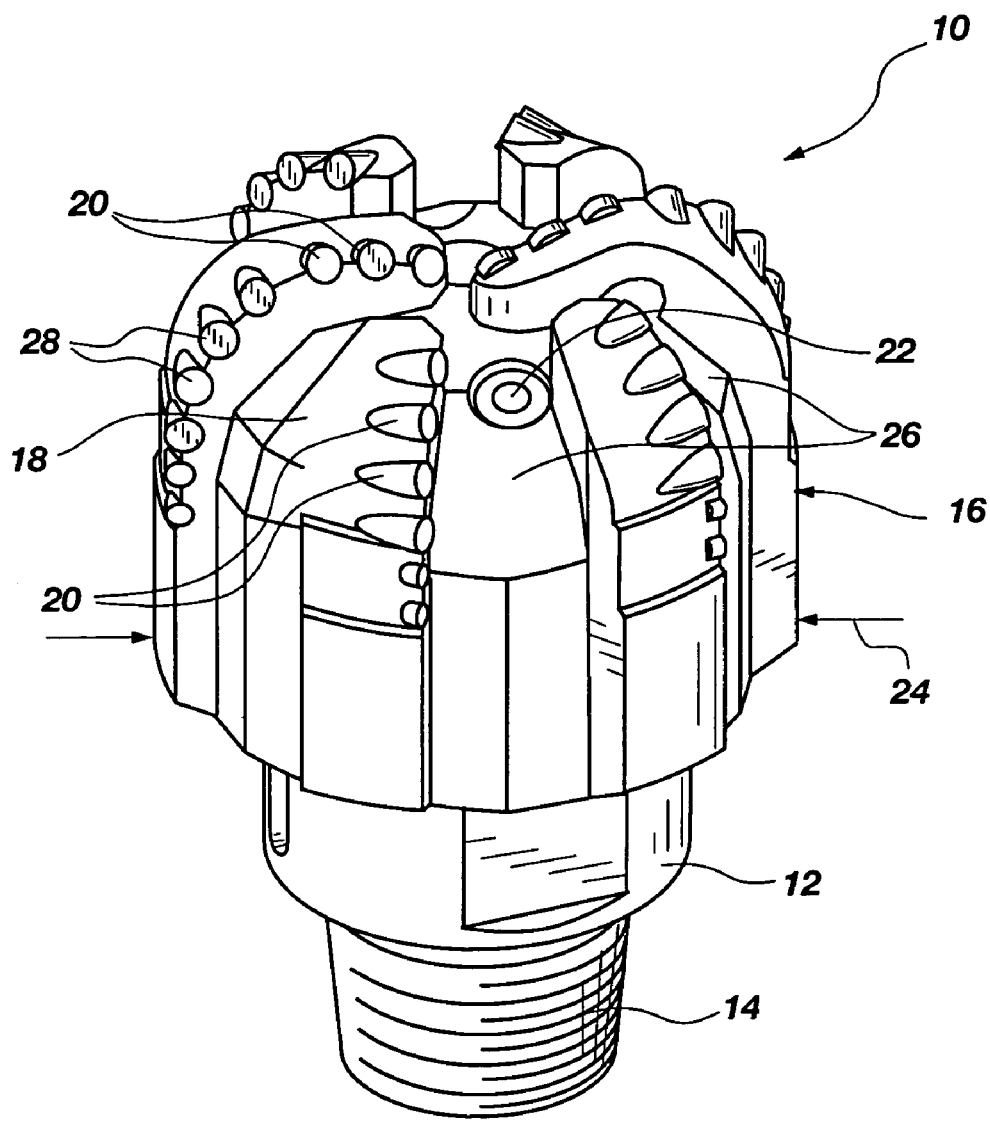
FIG. 1 is a perspective view of an exemplary drill bit incorporating cutting elements embodying the present invention.
Figure 2:
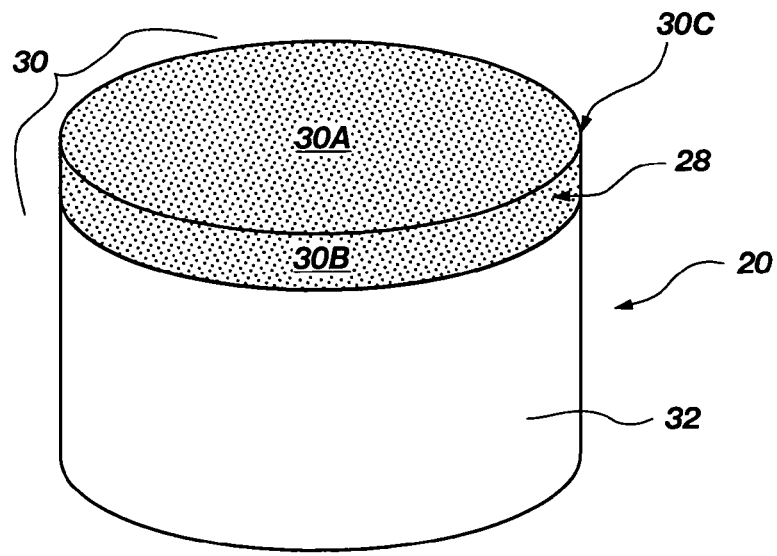
FIG. 2 is an enlarged perspective view of an exemplary cutting element embodying the present invention.

An exemplary, but not limiting, drill bit 10 having cutting elements 20 of the present invention is illustrated in FIGS. 1 and 2. Drill bit 10 is known and referred to in the art as a rotary, fixed cutter, or drag, bit useful for drilling in a wide variety of subterranean formations. For example, drill bit 10 is particularly suitable for drilling through subterranean formations to reach targeted areas in which deposits of crude oil and/or natural gas are known or suspected to be present, or which may be used for drilling special purpose subterranean bore holes. Cutting elements 20 of the present invention may be advantageously used in any of a wide variety of drill bit configurations suitable for incorporation of superabrasive cutting elements.

Drill bit 10 of FIG. 1 includes a bit shank 12 having a conventional pin end 14 to provide a threaded connection to a conventional jointed tubular drill string rotationally and longitudinally driven by a drilling rig on the surface. Alternatively, drill bit 10 may be connected in a manner known within the art to a bottomhole assembly which, in turn, is connected to a tubular drill string or to an essentially continuous coil of tubing. Such bottomhole assemblies may include a downhole motor to rotate the drill bit 10 in addition to, or in lieu of, being rotated by a rotary table or top drive located at the surface (not shown within the drawings). Furthermore, conventional pin end 14 may optionally be replaced with various alternative connection structures known within the art. Thus, drill bit 10 may readily be adapted to a wide variety of mechanisms and structures used for drilling subterranean formations. Drill bit 10 also includes a bit body 16 having a face 18 including fluid passages 26 fed by nozzles 22 and to which cutting elements 20 are secured either directly or on bladed structures as shown. Furthermore, and as customary in the art, gage 24 is the maximum diameter in which drill bit 10 is to have about its periphery. Gage 24 will thus determine the minimum diameter of the resulting bore hole that drill bit 10 will produce when placed into service. The gage of a small drill bit may be as small as a few centimeters and the gage of an extremely large drill bit may approach a meter, or more.

An exemplary cutting element 20 of the present invention, as shown in FIG. 2, includes a superabrasive table 28 of circular, rectangular or other polygon, oval, truncated circular, or other suitable cross-section. Superabrasive table 28, exhibiting a circular cross-section and an overall cylindrical configuration, or shape, is suitable for a wide variety of drill bits and drilling applications. Superabrasive table 28 of cutting element 20 is preferably formed with a conglomerated superabrasive material such as a polycrystalline diamond compact (PDC), with an exposed cutting face 30. Cutting face 30 will typically have a top 30A and a side 30B with the peripheral junction thereof serving as the cutting region of the cutting face and more precisely the cutting edge 30C of cutting face 30, which is usually the first portion of the cutting face 30 to contact and thus initially "cut" the formation as the drill bit 10 retaining cutting element 20 progressively drills a bore hole. Superabrasive table 28 will also typically have a primary underside, or attachment, interface face 30D joined during the sintering of the diamond, or superabrasive, layer forming superabrasive table 28 to a supporting substrate 32 formed of a hard and relatively tough material such as a cemented tungsten carbide or other carbide, as may be seen in FIG. 4A. Returning to FIG. 2 of the drawings, substrate 32 may be preformed in a desired shape such that a volume of particulate diamond material may be formed into a polycrystalline table 28 thereon and simultaneously strongly bonded to substrate 32 during HPHT sintering techniques practiced within the art. A unitary cutting element 20 will thus be provided that may then be secured to drill bit 10 by brazing or other techniques known within the art.

Figure 3:
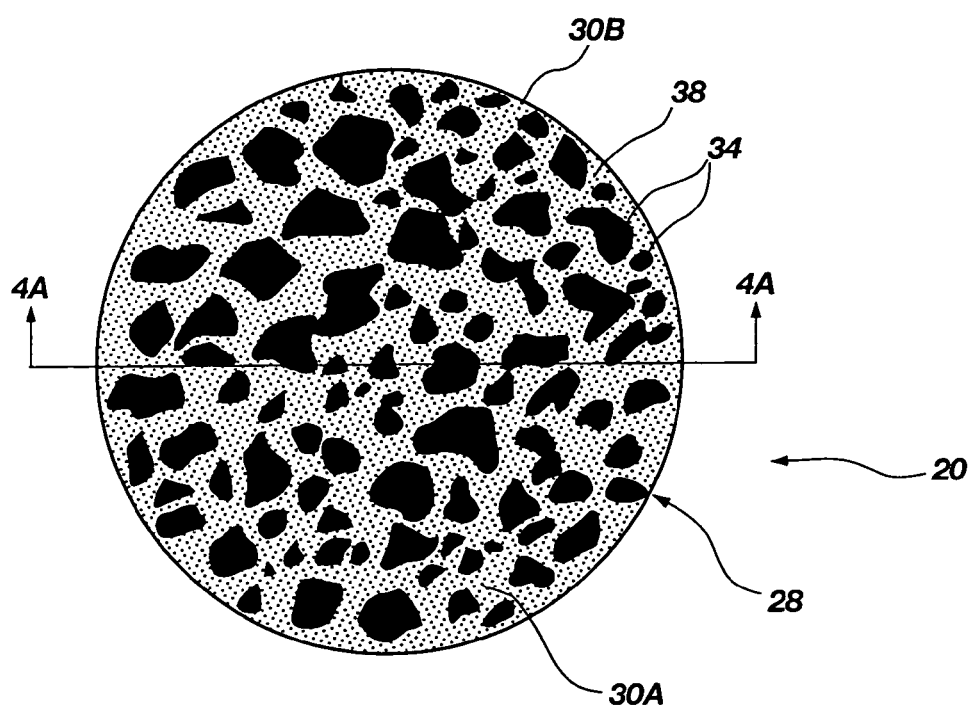
FIG. 3 is a top view of the cutting face of an exemplary cutting element embodying the present invention, and in which the differently sized superabrasive particles (not to scale) illustrate the present invention.
Figure 4A:
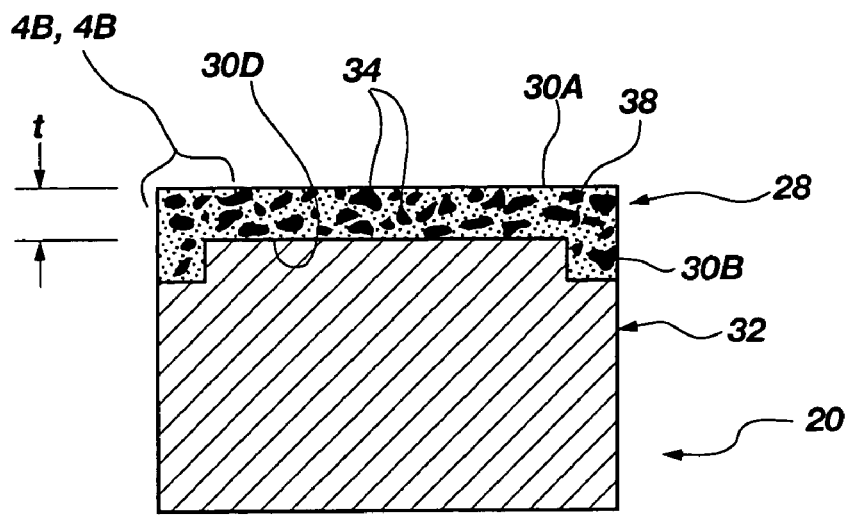
FIG. 4A is a cross-sectional view of the exemplary cutting element of the present invention before being placed into service, as taken along line 4A—4A of FIG. 3, and in which the differently sized superabrasive particles (not to scale) illustrate the present invention.
Figure 4B:
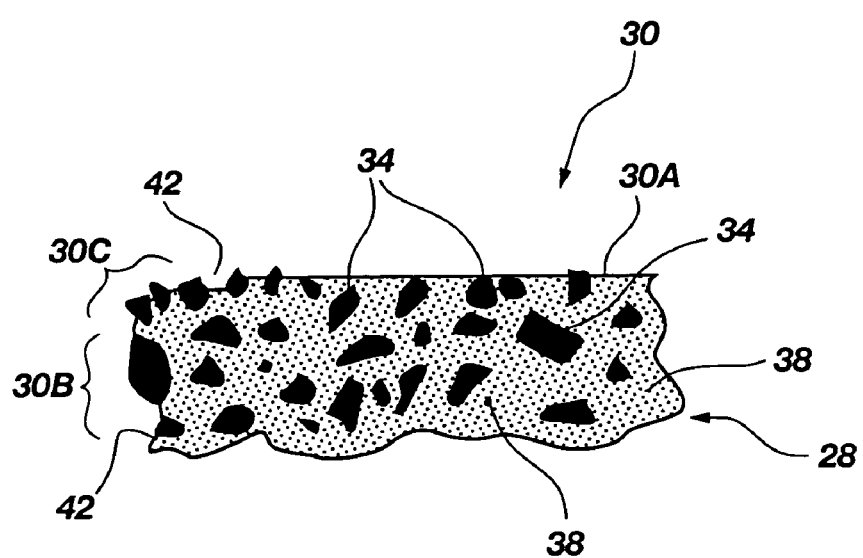
FIG. 4B is an enlarged cross-sectional view of an isolated edge portion of the superabrasive table taken in the same direction and as depicted in the view of the cross-sectional view of the cutting element of FIG. 4A after being placed into service; as with FIG. 4A, the differently sized superabrasive particles (not to scale) are shown.
Figure 4B:
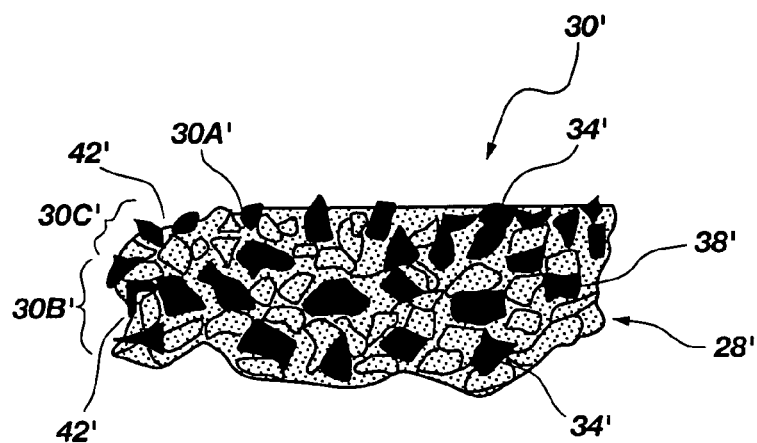

In order to better illustrate the present invention, features of superabrasive table 28 of cutting element 20 have been exaggerated in FIGS. 3, 4A, 4B, 4B', 4C, and 4D. In accordance with the present invention, superabrasive table 28 comprises a heterogeneous conglomerate type of PCD layer or diamond matrix in which at least two different nominal sizes and wear characteristics of superabrasive particles, such as diamonds of differing grains, or sizes, are included to ultimately develop a rough, or roughcut, cutting face 30, particularly with respect to cutting face side 30B and most particularly with respect to cutting edge 30C. Referring now to FIG. 3, which is a top view of cutting face top 30A, wherein larger diamonds or superabrasive particles 34 having a wear rate within a first selected wear rate distribution range may be seen to be substantially randomly dispersed within a greater number of smaller diamonds or superabrasive particles 38 having a wear rate within a second, different selected wear rate distribution range. For the sake of convenience, a mean exhibited wear rate of each of the wear rate distribution ranges may be employed to differentiate the respective wear rates. In one embodiment, larger diamonds 34 may range upwards of approximately 600 μm, with a preferred range of approximately 100 μm to approximately 600 μm, and smaller diamonds, or superabrasive particles, 38 may preferably range from about 15 μm to about 100 μm. In another embodiment, larger diamonds 34 may range upwards of approximately 500 μm, with a preferred range of approximately 100 μm to approximately 250 μm, and smaller diamonds, or superabrasive particles, 38 may preferably range from about 15 μm to about 40 μm.

The specific grit size of larger diamonds 34, the specific grit size of smaller diamonds 38, the thickness of cutting face 30 of superabrasive table 28, the amount and type of sintering agent, as well as the respective large and small diamond volume fractions, may be adjusted to optimize cutter 20 for cutting particular formations exhibiting particular hardness and particular abrasiveness characteristics. The relative, desirable particle size relationship of larger diamonds 34 and smaller diamonds 38 may be characterized as a tradeoff between strength and cutter aggressiveness. On the one hand, the desirability of the superabrasive table holding on to the larger particles during drilling would dictate a relatively smaller difference in average particle size between the smaller and larger diamonds. On the other hand, the desirability of providing a rough cutting surface would dictate a relatively larger difference in average particle size between the smaller and larger diamonds. Furthermore, the immediately preceding factors may be adjusted to optimize cutter 20 for the average rotational speed at which the cutting element will engage the formation as well as for the magnitude of normal force and torque to which each cutter 20 will be subjected while in service as a result of the rotational speeds and the amount of weight, or longitudinal force, likely to be placed on drill bit 10 during drilling.

By incorporating at least two groups of superabrasive particles of at least two substantially different mean wear rates, a primary characteristic of the present invention will be manifested by side 30B and cutting edge 30C of cutting face 30 of superabrasive table 28 developing a "roughcut" or asperital texture, as may be seen in the enlarged view of FIG. 4B, which depicts an isolated portion of superabrasive table 28 of exemplary cutting element 20, as shown in FIG. 4A. This particular aspect of the present invention enables cutting element 20 to more aggressively engage and remove the formation per each revolution of drill bit 10 when a bore hole is being drilled, thereby increasing the ROP. That is, the exposed "roughcut," or asperital, surface or surfaces of cutting face 30 may be generally attributable to larger diamonds, or superabrasive particles, 34 being slightly more exposed, particularly on side 30B and cutting edge 30C as shown in FIG. 4B or, alternatively, smaller diamonds 38 may be slightly more exposed.

The exact mechanism of forming the aforementioned asperital surface or surfaces is uncertain and may be related, in a given instance, to the selected proportional mix and number of superabrasive particle sizes as well as relative wear rates of superabrasive particles in the various volumes of such employed in forming superabrasive table 28. However, in one instance, the interstitial smaller diamonds or superabrasive particles 38 may wear away relatively more quickly as the cutting element is in service, resulting in vugs 42 providing asperities in the cutting surfaces. Such a "roughcut" or asperital texture of worn cutting face 30, and especially of worn cutting side 30B and cutting edge 30C, concentrates cutting forces in localized regions, i.e., primarily about the exposed portions of larger diamonds 34, to better engage and remove, or cut, the formation being drilled. Alternatively, larger diamonds 34 may wear away relatively more quickly, creating vugs 42 providing the asperities in the cutting surfaces provided by the remaining "matrix" of smaller diamonds 38. Larger diamond particles are inherently weaker than smaller ones and thus more easily fractured. Further, larger diamonds may be more difficult to sinter during formation of the superabrasive table 28, thus exhibiting weaker bonding thereto and resulting in easier loss therefrom. The foregoing relative bonding strengths of larger and smaller diamond particles within the superabrasive table 28 are encompassed by the term "wear rate" as used herein to indicate the overall tendency of a diamond particle to remain as a portion of a superabrasive table as the table wears during drilling.

Such improved efficiency may be particularly apparent while drilling hard, nonabrasive formations such as, but not limited to, limestones, shales, and evaporites. A portion of cutting face 30 will exhibit a roughcut, or asperital, surface, especially cutting edge 30C, which will be maintained throughout the life of the cutting element 20, because new asperities are constantly formed as the differently sized diamond particles are respectively worn away. However, the majority of culling top 30A, i.e., that portion of culling top 30A located to the right of cutting edge 30C as illustrated in FIG. 4B, will retain its original, preferably smooth finish as rendered by the final grinding, lapping or polishing process performed on the cutting element 20 during its manufacture because of its less aggressive interaction with the formation.

It should be understood that either natural diamonds or synthetic diamonds may be used as feedstock for forming cutting elements in accordance with the present invention. Furthermore, a combination of natural diamonds and synthetic diamonds may optionally be used as particulate feedstock for forming cutting elements in accordance with the present invention. Additionally, more than two selected sizes, or grains, of superabrasive particles may be used in practicing the present invention. For example, three or more different feedstocks of preselected superabrasive particles of a particular size, or falling within a preselected size range, may be used to provide a superabrasive table having at least one cutting surface, or at least a portion thereof, with the desired "roughcut," or asperital, surface preferably having randomly distributed larger superabrasive particles therein and wherein some of the abrasive particles eventually protrude substantially from at least a portion of the at least one cutting surface, or face, as the cutting element wears. Moreover, the at least one cutting surface, or a portion thereof, is provided with randomly distributed vugs of differing sizes to further enhance the effectiveness of the jagged cutting surfaces of exposed portions of the abrasive particles as interspersed, differently sized abrasive particles wear away as the cutting surface, and especially the cutting edge, wears with use.

FIG. 4B' illustrates another embodiment that may be used in lieu of, or in conjunction with, the prior embodiment. As discussed earlier, the prior embodiment, among other things, features at least two groups or pluralities of at least two differently sized superabrasive particles with differing wear characteristics in the superabrasive table of a cutting element. Instead of relying solely upon a mixture of disparately sized diamonds having differing wear rates to provide a cutting element having a cutting face including at least one cutting surface to eventually exhibit an exposed roughcut, asperital surface as previously described, alternative superabrasive table 28', a portion of which is illustrated in isolation in FIG. 4B', comprises superabrasive particles 34' and 38' which are generally of the same size but which are of differing inherent quality and strength or, in other words, of a substantially different grade. Thus, the inherently weaker, less strong, less abrasion-resistant, and/or lower grade of abrasive particles or diamonds 38' will be the first to wear away, fracture, or disintegrate and thereby be removed from a portion of cutting face top 30A', a portion of cutting face side 30B', and especially cutting edge 30C' to repeatedly and continuously form a plurality of preferably randomly distributed vugs 42' in at least the active cutting surfaces of superabrasive table 28' as the table wears throughout its service-life. In other words, differences in wear rates of superabrasive particles of differing quality, in lieu of or in combination with diamonds, or superabrasive particles of differing size or sizes, may be used to provide a cutting element having a roughcut, asperital cutting face in accordance with the present invention. Those regions of cutting face 30', including in most circumstances the vast majority of cutting face top 30A' and side 30B', which are generally not actively and directly engaging the formation, as discussed earlier with respect to superabrasive table 28 illustrated in FIG. 4A, essentially maintain the original smooth finish resulting from the grinding or polishing process performed on the cutting element during the manufacturing thereof. However, the active cutting surface or cutting edge 30C' will, as superabrasive table 28' wears, exhibit the desired rough, asperital surface of the present invention.

In order to fabricate an exemplary cutting element incorporating another embodiment of the present invention, a first feedstock of superabrasive particles, such as natural and/or synthetic diamonds, wherein the diamonds are of a high inherent quality, high strength, and high abrasion resistance, are combined with a second feedstock of superabrasive particles, such as natural and/or synthetic diamonds of generally the same size as the first feedstock, but wherein the diamonds of the second feedstock are of at least one of a substantially lower inherent quality, lower strength, and lower abrasion resistance than those of the first feedstock. Thus, the fraction of weaker, lower quality diamonds 38' will be more quickly worn away from the exposed surfaces of the table, such as top 30A', thereby leaving vugs 42' as the cutting element wears with the fraction of stronger, higher quality diamonds 34' staying in place longer to provide the desired randomly dispersed jagged cutting edges, or surfaces, to concentrate the cutting forces in localized regions in accordance with the present invention. If desired, weaker diamonds 38' may be sized substantially smaller as described above with respect to superabrasive particles 34'. This allows further tailoring, or fine tuning, of the desired degree of asperity, or roughness, of the exposed cutting regions or surfaces of a table or cutting element is to exhibit when constructing cutting elements in accordance with the present invention as well as controlling the superabrasive particle density in the superabrasive table 28.

Superabrasive particles may have differing qualities for any number of reasons. For instance, internal flaws, inclusions, materials used, growth rate, and sintering kinetics may affect the quality of any given superabrasive particle.

Catalyst distribution and interaction is also of importance in superabrasive particle quality. One method that may result in a higher quality feedstock is termed "multiple-sintering" processing. Multiple-sintering processing involves exposing superabrasive particles to HPHT processing, then reducing the sintered structure to particles for use in additional HPHT processing. Such multiple-sintering processing may improve the inherent quality of the feedstock and may distribute catalyst more evenly and effectively, thus improving the quality of the final sintered superabrasive table. Therefore, multiple-sintering may be used in accordance with the present invention.

Figure 4C:
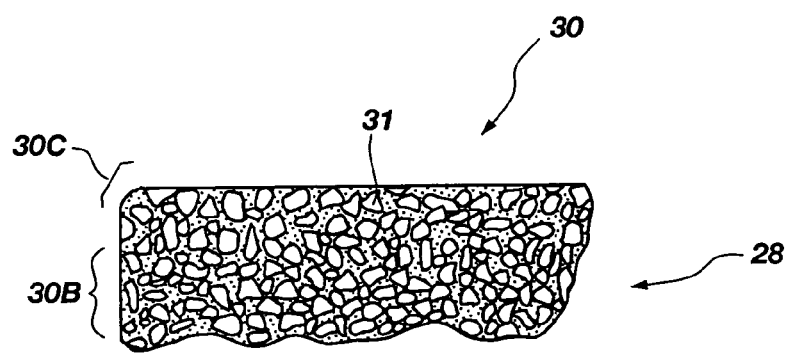
FIG. 4C is an enlarged cross-sectional view of an isolated edge portion of a superabrasive table comprising diamond particles of a specified size range and substantially homogeneous wear characteristics after being placed into service as taken in the same direction and depicted in the same manner as the enlarged, isolated cross-sectional view of the cutting element of FIG. 4B, as with FIG. 4A, wherein the edge portion exhibits a rounded geometry.
Figure 4D:
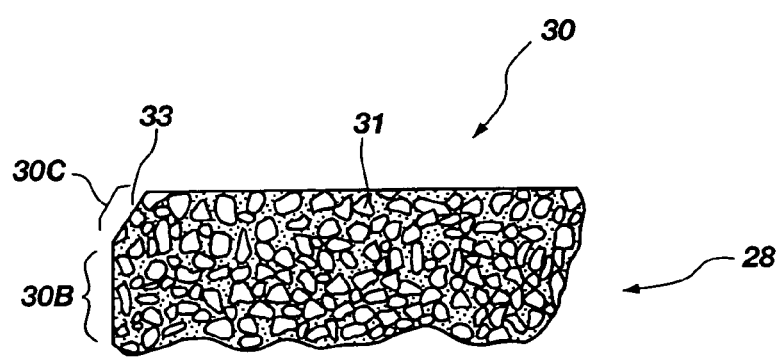
FIG. 4D is an enlarged cross-sectional view of an isolated edge portion of a superabrasive table comprising diamond particles of a specified size range and substantially homogeneous wear characteristics after being placed into service as taken in the same direction and depicted in the same manner as the enlarged, isolated cross-sectional view of the cutting element of FIG. 4B, as with FIG. 4A, wherein the edge portion exhibits a wear-scar.

FIGS. 4C and 4D each show superabrasive table 28 composed of homogeneous superabrasive particles 31 of a specified size range and exhibiting substantially uniform wear characteristics. Two problems associated with cutting elements composed of homogeneous wearing of superabrasive table 28 are illustrated in FIGS. 4C and 4D. Specifically, FIG. 4C shows a superabrasive table 28 after being placed into service as taken in the same direction and depicted in the same manner as in FIGS. 4A and 4B with a rounded cutting edge 30C. Rounded cutting edge 30C is formed from an initially sharp edge coming in contact with the formation during drilling. Rounded cutting edge 30C requires considerably more force in order to drill a formation at a given rate of penetration than a sharp cutting element would require, as the load on the rounded cutting edge 30C is applied over a significantly greater surface area. Thus, aggressiveness of the cutting element with a rounded cutting edge 30C is reduced when compared to a cutting element of the present invention. Further, FIG. 4D shows a superabrasive table 28 after being placed into service as taken in the same direction and depicted in the same manner as in FIGS. 4A and 4B with a wear scar surface 33 along the cutting edge 30C. Wear-scarred cutting edge 30C requires even more force in order to drill a formation at a given rate of penetration than a rounded or sharp cutting element would require as a result of its even greater surface area oriented toward the formation. Thus, a cutting element with a wear-scarred cutting edge 30C, as shown in FIG. 4D, is also less aggressive than a cutting element of the present invention.

Referring now to FIGS. 5 and 6, FIG. 5 is a photomicrograph of the top cutting surface of an exemplary cylindrically shaped PCD cutting element exemplifying a preferred embodiment of the present invention, magnified eight times the actual size. The actual size of the exemplary cutting element of FIG. 5 is approximately 1.3 cm in diameter. FIG. 6 is a representative portion of the same top cutting surface photographed in FIG. 5, but is magnified twenty times the actual size of the cutting element photographed in FIG. 5. The larger diamond particles appear as dark-colored shapes dispersed with the lighter-colored smaller diamond particles, all of which are sintered together to provide a superabrasive cutting table embodying the present invention. The larger diamond particles have a nominal diameter of approximately 600 μm and the smaller diamond particles have a nominal diameter of approximately 20 μm.

In practice, it is often difficult to randomly disperse differently sized diamond particles. Often, due to slight differences in packing density and vibrations present or applied during manufacturing, differently sized diamond particles segregate. As illustrated in FIG. 5, the larger diamond particles have segregated somewhat, forming a slight gradient toward edge 50 during the manufacturing process. Such segregation may be used advantageously to produce cutting tables with varying characteristics as the cutting element wears, or to produce a useful portion of a superabrasive table (such as a cutting edge) which exhibits a relatively higher or lower concentration of a particular particle size or sizes with respect to the remainder of the cutting element serving largely for securing the cutting element to a drill bit. Alternatively, segregation may be advantageously used to produce designed variances such as cutting edges with different or varying asperital characteristics. For example, diamond particles within a given size distribution range may extend from approximately 5% of the nominal thickness of the superabrasive table to approximately 40% of the nominal thickness of the superabrasive table. As another alternative, agents may be used to prevent or reduce segregation of the particles prior to sintering. Glycerin is sometimes used to inhibit segregation of powders, as well as other means known in the art. However, such additional materials may not be desirable for cleanliness and material compatibility reasons.

A cobalt sintering agent or catalyst as known in the art was used in the fabrication of the exemplary PDC cutting element shown in FIGS. 5 and 6. Furthermore, the supporting substrate to which the photographed superabrasive table is sintered was constructed of a cemented tungsten carbide material, also well known and used within the art.

It should be further appreciated that although the present invention, as set forth herein, has been described and illustrated in the context of a cutting element having a superabrasive table bonded, or sintered, to an underlying relatively tough substrate which in turn may be secured to a drill bit, other types of cutting elements, such as freestanding or unsupported cutting elements comprising a volume of polycrystalline diamond or other superabrasive material may be fabricated which incorporate one or more aspects of the present invention in light of the preceding description and the drawings included herein.

This invention may be embodied in many forms without departing from the spirit of the invention disclosed herein. Therefore, the various embodiments disclosed herein are intended to be illustrative and not restrictive, and the scope of the appended claims are not to be unduly limited by the preceding description and drawings. Furthermore, all variations and combinations encompassed by the disclosed subject matter, or which are equivalent thereto, are therefore intended to be embraced by the following claims.

What is claimed is:

1. A cutting element for use on a rotary drill bit for drilling subterranean formations, the cutting element comprising:
   a supporting substrate;
   a superabrasive table including a cutting face having a cutting edge along a periphery thereof and consisting essentially of a plurality of mutually superabrasively bonded individual superabrasive particles comprising:
      a first volume of individual superabrasive particles, wherein the individual superabrasive particles of the first volume generally exhibit a wear rate within a first wear rate distribution range; and
      at least a second volume of individual superabrasive particles interspersed with superabrasive particles of the first volume, wherein the individual superabrasive particles of the at least a second volume generally exhibit a wear rate within a second wear rate distribution range different than the first wear rate distribution range;
   wherein the cutting edge of the cutting face, upon contact with a subterranean formation, wears in a nonuniform manner so as to exhibit an asperital profile.

2. The cutting element of claim 1, wherein at least a fraction of the individual superabrasive particles of the first volume exhibit a mean wear rate substantially different than a mean wear rate of the individual superabrasive particles of the at least a second volume.

3. The cutting element of claim 1, wherein the individual superabrasive particles of the first volume exhibit a size generally within a first size distribution range and the individual superabrasive particles of the at least a second volume exhibit a size generally within a second, different size distribution range.

4. The cutting element of claim 3, wherein the individual superabrasive particles within the first size distribution range are generally relatively larger than the individual superabrasive particles within the second, different size distribution range.

5. The cutting element of claim 3, wherein the first size distribution range is approximately 15 μm to approximately 100 μm.

6. The cutting element of claim 3, wherein the second different size distribution range is approximately 100 μm to approximately 600 μm.

7. The cutting element of claim 3, wherein at least a fraction of the first volume of individual superabrasive particles is comprised of a first grade of superabrasive particles based upon at least one of inherent quality, strength, and wear resistance, at least a fraction of the at least a second volume of individual superabrasive particles is comprised of a second grade of superabrasive particles based upon at least one of inherent quality, strength, and wear resistance, and the second grade of superabrasive particles are generally inferior to the first grade of superabrasive particles.

8. The cutting element of claim 7, wherein the individual superabrasive particles within the first size distribution range are generally relatively larger than the individual superabrasive particles of the second size distribution range.

9. The cutting element of claim 3, wherein the first size distribution range is approximately 15 μm to approximately 40 μm.

10. The cutting element of claim 3, wherein the second size distribution range is approximately 100 μm to approximately 250 μm.

11. The cutting element of claim 1, wherein at least a fraction of the first volume of individual superabrasive particles and at least a fraction of the at least a second volume of individual superabrasive particles are each selected from the group consisting of natural diamonds and synthetic diamonds.

12. The cutting element of claim 1, wherein at least a fraction of the first volume of individual superabrasive particles is comprised of a first grade of superabrasive particles based upon at least one inherent quality related to wear characteristics, at least a fraction of the at least a second volume of individual superabrasive particles is comprised of a second grade of superabrasive particles based upon at least one inherent quality related to wear characteristics, wherein the inherent quality of the second grade of individual superabrasive particles is generally different than the inherent quality of the first grade of individual superabrasive particles.

13. The cutting element of claim 1, wherein the individual superabrasive particles of the first volume and the at least a second volume comprise diamonds and the supporting substrate comprises tungsten carbide.

14. The cutting element of claim 1, wherein the superabrasive table has a nominal thickness and comprises a top surface and a side surface extending peripherally about at least a portion thereof.

15. The cutting element of claim 14, further comprising a cutting edge positioned intermediate the top surface and at least a portion of the peripherally extending side surface.

16. The cutting element of claim 15, wherein the top surface is generally circular.

17. The cutting element of claim 1, wherein the superabrasive table has a nominal thickness and the individual superabrasive particles of the first volume have a size generally within a first size distribution range.

18. The cutting element of claim 17, wherein the first size distribution range extends from approximately 5% of the nominal thickness of the superabrasive table to approximately 40% of the nominal thickness of the superabrasive table.

19. The cutting element of claim 18, wherein the superabrasive particles of the at least a second volume of individual superabrasive particles are of a particle size generally within a second size distribution range and the particles within the second size distribution range are generally relatively smaller than the individual superabrasive particles within the first size distribution range.

20. The cutting element of claim 15, wherein the superabrasive table comprises a top surface and a side surface extending peripherally about at least a portion thereof.

21. The cutting element of claim 1, wherein the superabrasive table further comprises a third volume of individual superabrasive particles interspersed with and bonded to individual superabrasive particles of the first volume and the at least a second volume, wherein the individual superabrasive particles of the third volume generally exhibit a wear rate within a third wear rate distribution range different than the first wear rate distribution range and the second wear rate distribution range.

22. The cutting element of claim 21, wherein the individual superabrasive particles of the first, at least a second and third volumes are respectively within first, second and third differing size distribution ranges.

23. The cutting element of claim 21, wherein individual superabrasive particles of at least one of the first, the at least a second and the third volumes are of a different grade, based upon at least one of inherent quality, strength and wear resistance, than individual superabrasive particles of at least one other of the first, at least a second and third volumes.

24. The cutting element of claim 1, wherein at least a fraction of the individual superabrasive particles of at least one of the first volume and the at least a second volume has been sintered at least once prior to formation of the superabrasive table.

25. The cutting element of claim 1, wherein at least a fraction of the individual superabrasive particles of at least one of the first volume and the at least a second volume are substantially segregated with respect to superabrasive particles of another volume.

26. A rotary drill bit for drilling subterranean formations, comprising:
  a bit body including a plurality of cutting elements secured thereto;
  at least one of the plurality of cutting elements having a superabrasive table bonded to a supportive substrate, the superabrasive table including a cutting face having a cutting edge along a periphery thereof and consisting essentially of a plurality of mutually superabrasively bonded individual superabrasive particles comprising:

a first volume of individual superabrasive particles generally exhibiting a wear rate within a first wear rate distribution range; and at least one second volume of individual superabrasive particles interspersed with individual superabrasive particles of the first volume, the individual superabrasive particles of the at least one second volume generally exhibiting a wear rate within a second wear rate distribution range different than the first wear rate distribution range;

wherein the cutting edge of the cutting face, upon contact with a subterranean formation, wears in a nonuniform manner so as to exhibit an asperital profile.

27. The rotary drill bit of claim 26, wherein at least a fraction of the first volume of individual superabrasive particles exhibits a mean wear rate substantially different than a mean wear rate of the at least one second volume of individual superabrasive particles.

28. The rotary drill bit of claim 26, wherein the first volume of individual superabrasive particles includes particles generally within a first size distribution range and the at least one second volume of individual superabrasive particles includes particles generally within a second, different size distribution range.

29. The rotary drill bit of claim 28, wherein the individual superabrasive particles within the first size distribution range are generally relatively larger than the individual superabrasive particles of the second size distribution range.

30. The rotary drill bit of claim 28, wherein the first size distribution range is approximately 15 μm to approximately 100 μm.

31. The rotary drill bit of claim 28, wherein the second size distribution range is approximately 100 μm to approximately 600 μm.

32. The rotary drill bit of claim 28, wherein at least a fraction of the first volume of individual superabrasive particles is comprised of a first grade of superabrasive particles based upon at least one of inherent quality related to wear characteristics, at least a fraction of the at least one second volume of individual superabrasive particles is comprised of a second grade of superabrasive particles based upon at least one of inherent quality related to wear characteristics, and the inherent quality of the second grade of superabrasive particles is generally inferior to the inherent quality of the first grade of superabrasive particles.

33. The rotary drill bit of claim 32, wherein the individual superabrasive particles within the first size distribution range are generally relatively larger than the individual superabrasive particles within the second size distribution range.

34. The rotary drill bit of claim 26, wherein at least a fraction of the first volume of individual superabrasive particles and at least a fraction of the at least one second volume of individual superabrasive particles are each selected from the group consisting of natural diamonds and synthetic diamonds.

35. The rotary drill bit of claim 26, wherein at least a fraction of the first volume of individual superabrasive particles is comprised of a first grade of superabrasive particles based upon at least one of inherent quality related to wear characteristics, at least a fraction of the at least one second volume of individual superabrasive particles is comprised of a second grade of superabrasive particles based upon at least one of inherent quality related to wear characteristics, and the inherent quality of the second grade of superabrasive particles is generally inferior to the inherent quality of the first grade of superabrasive particles.

36. The rotary drill bit of claim 26, wherein the first volume of individual superabrasive particles and the at least one second volume of individual superabrasive particles comprise diamonds and the supportive substrate comprises tungsten carbide.

37. The rotary drill bit of claim 26, wherein the superabrasive table has a nominal thickness and comprises a top surface and a peripherally extending side surface.

38. The rotary drill bit of claim 37, further comprising a cutting edge positioned intermediate the top surface and the peripherally extending side surface.

39. The rotary drill bit of claim 38, wherein the top surface is generally circular.

40. The rotary drill bit of claim 26, wherein the superabrasive table has a nominal thickness and the first volume of individual superabrasive particles includes particles lying generally within a first size distribution range.

41. The rotary drill bit of claim 40, wherein the first size distribution range extends from approximately 5% of the nominal thickness of the superabrasive table to approximately 40% of the nominal thickness of the superabrasive table.

42. The rotary drill bit of claim 41, wherein the at least one second volume of individual superabrasive particles includes particles lying generally within a second size distribution range and the particles lying generally within the second size distribution range are generally relatively smaller than the particles lying generally within the first size distribution range.

43. The rotary drill bit of claim 41, wherein the first size distribution range is approximately 15 μm to approximately 100 μm.

44. The rotary drill bit of claim 42, wherein the superabrasive table comprises a top surface and a peripherally extending side surface.

45. The rotary drill bit of claim 42, wherein the second size distribution range is approximately 100 μm to approximately 600 μm.

46. The rotary drill bit of claim 26, wherein the at least one second volume of superabrasive particles comprises a third volume of individual superabrasive particles interspersed within the first volume and the at least one second volume of individual superabrasive particles, the third volume of individual superabrasive particles each generally exhibiting a wear rate within a third wear rate distribution range different than the first wear rate distribution range and the second wear rate distribution range.

47. The rotary drill bit of claim 26, wherein the rotary drill bit is a drag bit.

48. The rotary drill bit of claim 47, wherein the drag bit comprises at least one blade structure and the at least one cutting element is disposed on the at least one blade structure.

49. The rotary drill bit of claim 26, wherein at least a fraction of the first volume of individual superabrasive particles is segregated with respect to the at least one second volume of individual superabrasive particles.

* * * * *

UNITED STATES PATENT AND TRADEMARK OFFICE
CERTIFICATE OF CORRECTION

PATENT NO. : 7,048,081 B2
APPLICATION NO. : 10/447884
DATED : May 23, 2006
INVENTOR(S) : Redd H. Smith, Marcus R. Skeem and Craig H. Cooley It is certified that error appears in the above-identified patent and that said Letters Patent is hereby corrected as shown below:

In the drawings:

In FIG. 4A    change reference numerals "4B, 4B" to --4B, 4B'--

In the specification:

| | | |
|---|---|---|
| COLUMN 2, | LINE 11, | change "modem" to --modern-- |
| COLUMN 2, | LINE 12, | change "forrming" to --forming-- |
| COLUMN 4 | LINE 15, | change "crystals, and" to --crystals, a-- |
| COLUMN 11, | LINE 33, | change "culling top 30A," to --cutting top 30A,-- |
| COLUMN 11, | LINES 33-34, | change "culling top 30A" to --cutting top 30A-- |

In the claims:

CLAIM 12, COLUMN 15, LINE 52,    change "cuffing element" to --cutting element--

UNITED STATES PATENT AND TRADEMARK OFFICE
CERTIFICATE OF CORRECTION

PATENT NO.        : 7,048,081 B2                                         Page 2 of 2
APPLICATION NO.   : 10/447884
DATED             : May 23, 2006
INVENTOR(S)       : Redd H. Smith, Marcus R. Skeem and Craig H. Cooley It is certified that error appears in the above-identified patent and that said Letters Patent is hereby corrected as shown below:

Please replace FIG. 4A with the following replacement figure:

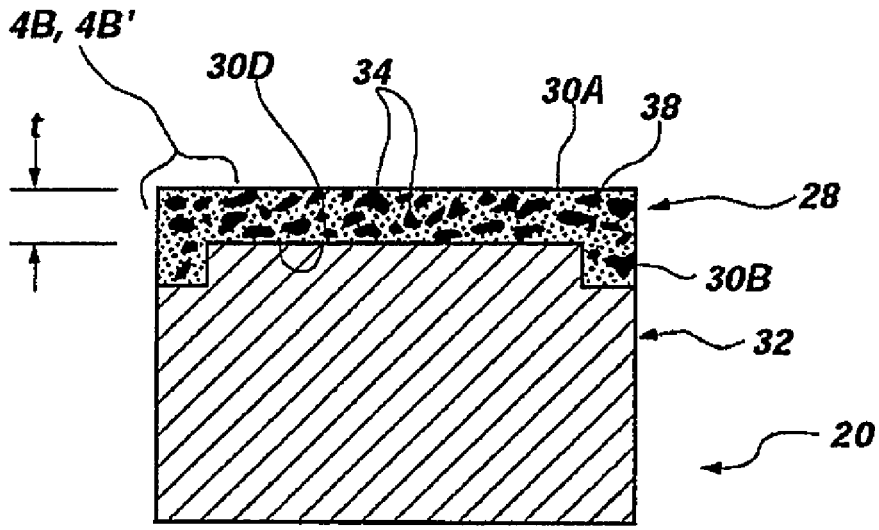

FIG. 4A

Signed and Sealed this

Eighth Day of May, 2007

JON W. DUDAS
*Director of the United States Patent and Trademark Office*